US007558911B2

(12) United States Patent
Garney et al.

(10) Patent No.: US 7,558,911 B2
(45) Date of Patent: Jul. 7, 2009

(54) MAINTAINING DISK CACHE COHERENCY IN MULTIPLE OPERATING SYSTEM ENVIRONMENT

(75) Inventors: John I. Garney, Portland, OR (US); Robert J. Royer, Jr., Portland, OR (US); Jeanna N. Matthews, Massena, NY (US); Kirk D. Brannock, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 953 days.

(21) Appl. No.: 10/739,254

(22) Filed: Dec. 18, 2003

(65) Prior Publication Data

US 2005/0138282 A1 Jun. 23, 2005

(51) Int. Cl.
*G06F 12/06* (2006.01)
(52) U.S. Cl. .................................. 711/113; 711/205
(58) Field of Classification Search ................. 711/118, 711/154, 171, 173, 113, 112, 129, 130, 141, 711/144, 145, 170, 207, 206, 205; 710/6, 710/316; 714/3; 713/2; 717/154, 176
See application file for complete search history.

(56) References Cited

U.S. PATENT DOCUMENTS 4,296,465 A * 10/1981 Lemak ........................ 710/316
5,142,680 A * 8/1992 Ottman et al. ............... 717/176
5,675,769 A * 10/1997 Ruff et al. .................... 711/173
5,764,922 A * 6/1998 Peacock et al. ................ 710/6
5,936,832 A * 8/1999 Saito et al. ............... 361/321.4
6,178,487 B1 * 1/2001 Ruff et al. .................... 711/112
6,453,404 B1 * 9/2002 Bereznyi et al. ............. 711/171
6,606,685 B2 * 8/2003 Huxoll ........................ 711/118
6,647,508 B2 * 11/2003 Zalewski et al. ............... 714/3
6,687,819 B1 * 2/2004 Aguilar et al. ................ 713/2
6,698,015 B1 * 2/2004 Moberg et al. .............. 717/154
6,968,425 B2 * 11/2005 Hashimoto .................. 711/113
6,973,447 B1 * 12/2005 Aguilar et al. ................. 707/1
7,412,562 B2 * 8/2008 Garney ....................... 711/113
2001/0037433 A1 * 11/2001 Dempsey et al. ............. 711/141
2003/0070083 A1 * 4/2003 Nessler ....................... 713/193
2005/0015566 A1 * 1/2005 Zohar et al. ................. 711/203
2005/0138282 A1 * 6/2005 Garney et al. ............... 711/113

OTHER PUBLICATIONS

Hong Tang et al, "An Efficient Data Location Protocol for Self-Organizing Storage Clusters", Proceedings of the ACM/IEEE SC2003 Conference, 2003.*

* cited by examiner

*Primary Examiner*—Pierre-Michel Bataille
(74) *Attorney, Agent, or Firm*—Trop, Pruner & Hu, P.C.

(57) ABSTRACT

Processor-based systems may use more than one operating system and may have disk drives which are cached. Systems which include a write-back cache and a disk drive may develop incoherent data when operating systems are changed or when disk drives are removed. Scrambling a partition table on a disk drive and storing cache identification information may improve data coherency in a processor-based system.

28 Claims, 3 Drawing Sheets

MAINTAINING DISK CACHE COHERENCY IN MULTIPLE OPERATING SYSTEM ENVIRONMENT

BACKGROUND

A cache is a memory device that logically resides between a device, such as a disk drive, and the remainder of the processor-based system. A cache is a memory device that serves as a temporary storage area for the device, such as the disk drive. Frequently accessed data resides in the cache after an initial access. Subsequent accesses to this same data may be made to the cache instead of to the disk drive. Generally, two types of disk cache are used, write-through cache and write-back cache. Write-through disk cache means that the information is written both to the cache and to the corresponding disk drive. Write-back disk cache means that information is only written to the cache and the corresponding disk drive is subsequently updated when the corresponding cache line is flushed. Write-back is faster than write-through cache but may cause coherency problems since the data in the cache may be different than in the corresponding disk drive until the corresponding cache line is flushed. A cache line of data is dirty if the data in the cache line has been updated by the system but the corresponding disk drive has not been updated. A clean cache line is a line of data in cache that has been flushed (updated) to the corresponding disk drive.

In a processor-based system which supports multiple operating systems such as Windows™, Unix, and Linux, a user may modify data on a cached drive without the corresponding cache being updated, resulting in cache incoherency. For example, a system with a cached drive may be re-booted using a second operating system that does not support disk caching. The cache may not get flushed even though the second operating system may write to the disk drive which would result in disk-cache incoherencies.

Additionally, processor-based system may use write-back disk cache on a disk drive that is removable during the normal operation of the computer. The disk drive may then be installed into another processor-based system which may write to this disk drive. The disk cache and disk drive data may not be coherent if the disk drive is reinstalled into the first system.

Thus, a need exists for alternative ways of implementing a disk cache which can maintain cache-disk coherence.

DETAILED DESCRIPTION

Figure 1:
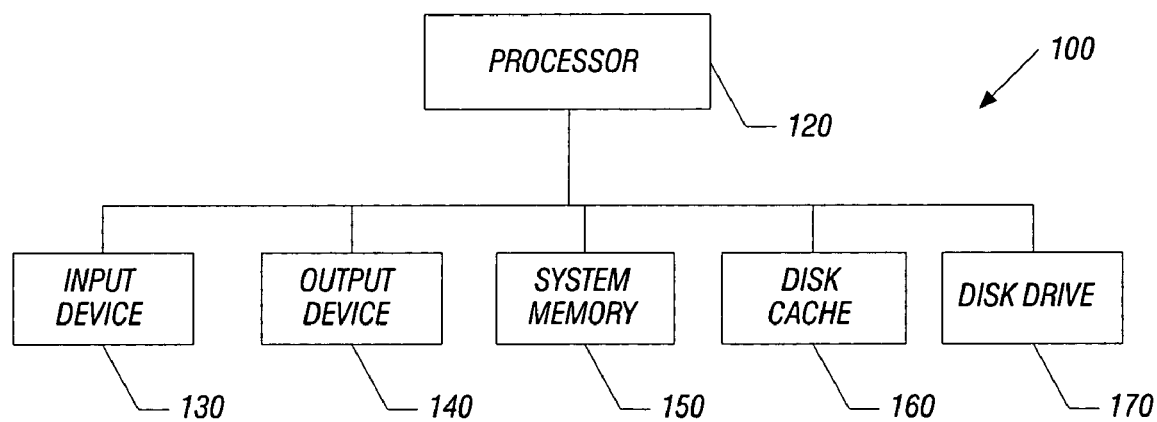
FIG. 1 is a block diagram of a processor-based system in accordance with an embodiment of the present invention.

Referring to FIG. 1, a processor-based system 100 may be a desktop computer, a laptop computer, a server, a telecommunication device, or any of a variety of other processor-based systems. The system 100 may include an input device 130 coupled to the processor 120. The input device 130 may include a keyboard or a mouse. The system 100 may also include an output device 140 coupled to the processor 120. The output device may include a display device such as a cathode ray tube monitor, liquid crystal display, or a printer. Additionally, the processor 120 may be coupled to system memory 150 which may include any number of memory devices such as a plurality of read only memory (ROM) or random access memory (RAM). Additionally, the system 100 may include a disk cache 160 coupled to the processor 120. The disk cache 160 may include an option read only memory which may be a medium for storing instructions and/or data. Other mediums for storing instructions may include system memory 150, disk cache 160, or disk drive 170. The disk drive 170 may a hard drive, or solid state disk device, a floppy drive, a compact disk drive (CD), or a digital video disk (DVD).

In one embodiment, disk cache 160 may be made from a ferroelectric polymer memory. Data may be stored in layers within the memory. The higher the number of layers, the higher the capacity of the memory. Each of the polymer layers includes polymer chains with dipole moments. Data may be stored by changing the polarization of the polymer between metal lines.

Ferroelectric polymer memories are non-volatile memories with sufficiently fast read and write speeds. For example, microsecond initial reads may be possible with write speeds comparable to those with flash memories.

In another embodiment, disk cache 160 may include dynamic random access memory or flash memory. A battery may be included with the dynamic random access memory to provide non-volatile functionality.

In the typical operation of system 100, the processor 120 may access system memory 150 to execute a power on self test (POST) program and/or a basic input output system (BIOS) program. The processor 120 may use the BIOS or POST software to initialize the system 100. The processor 120 may then access the disk drive 170 to retrieve and load operating system software. The operating system software may include device drivers which may include, for example, a cache driver. In one embodiment, the disk drive 170 may have multiple operating systems. In another embodiment, a second disk drive device, which is not shown in FIG. 1, may provide system 100 with additional or multiple operating systems.

The system 100 may also receive input from the input device 130 or it may run an application program stored in system memory 150. The system 100 may also display the system 100 activity on the output device 140. The system memory 150 may be used to hold application programs or data that is used by the processor 120. The disk cache 160 may be used to cache data for the disk drive 170, although the scope of the present invention is not so limited.

Figure 2:
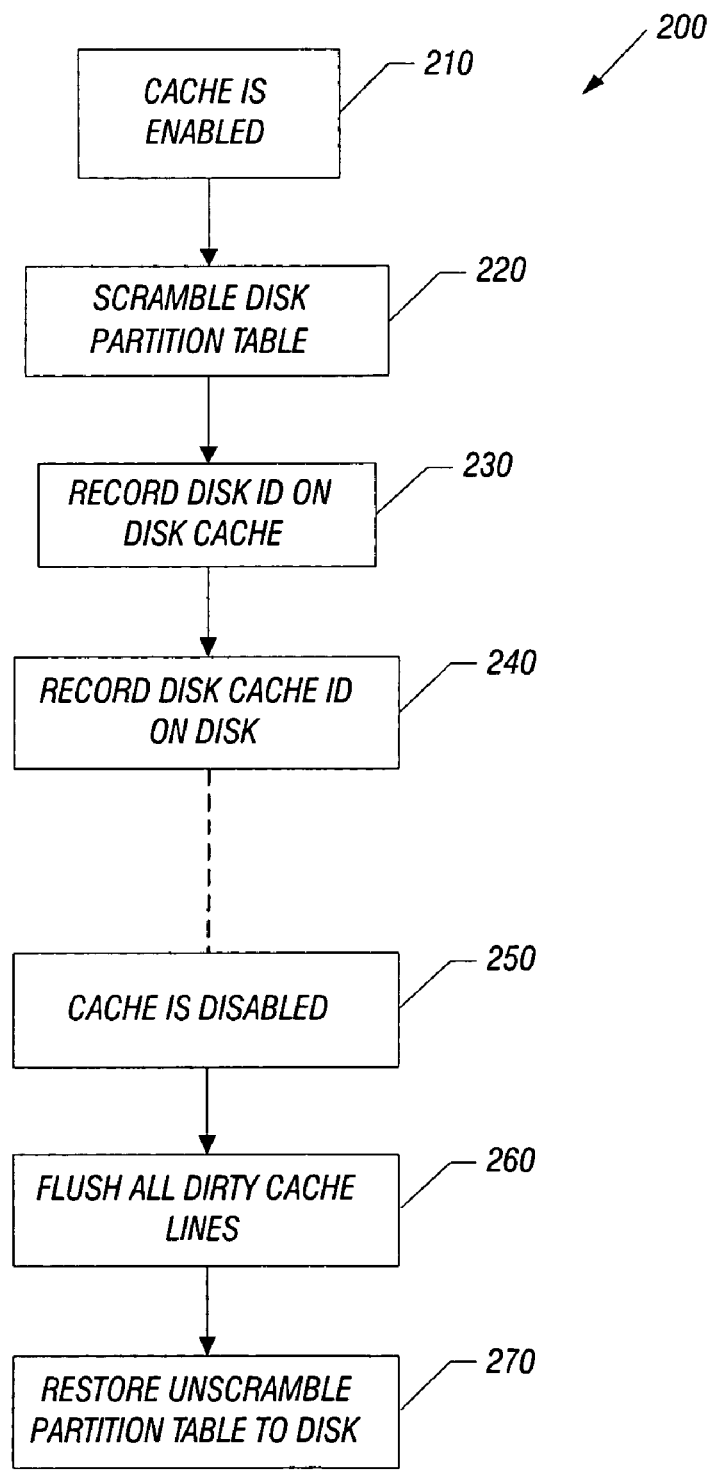
FIG. 2 is a flow chart in accordance with an embodiment of the present invention.

Referring to FIG. 2, an algorithm 200 for disk caching in a processor-based system in accordance with one embodiment of the invention may be implemented in hardware or by executing software stored in a medium in system 100. Mediums for storing instructions for software may include system memory 150, disk cache 160 or disk drive 170 of FIG. 1, for example. In the processor-based system 100 of FIG. 1, disk cache 160 may be enabled, as illustrated in block 210. When the disk cache 160 is enabled, a disk partition table may be scrambled or disarranged in order to make the disk partition table unintelligible, as illustrated in block 220. A partition table may be the memory space on a disk which may store how the disk drive is partitioned or divided. In one embodiment of this invention, the unscrambled disk partition table may be saved either in the disk cache 160 or elsewhere in system memory 150 of FIG. 1. In block 230, disk drive identification data may be stored in the disk cache 160 to indicate that disk drive caching is enabled. Similarly in block 240, a disk cache identification data may be stored or recorded on the disk drive 170 which may also indicate that the drive is being cached. A disk drive 170 may be uniquely identified by an industry standard identification protocol. Similarly, a unique identifier may be created and used to identify the cache 160, in certain embodiments.

By scrambling or disarranging the disk partition table, the corresponding disk drive 170 may not be accessible without its corresponding disk cache 160 being enabled. In this case, the disk drive 170 may be accessed by disabling disk cache 160, as illustrated in block 250. Then, the dirty cache lines may be flushed and the partition table restored by unscrambling the partition table as illustrated in block 260 and block 270, respectively. The disk drive may now be directly accessed without disturbing the cache.

Figure 3:
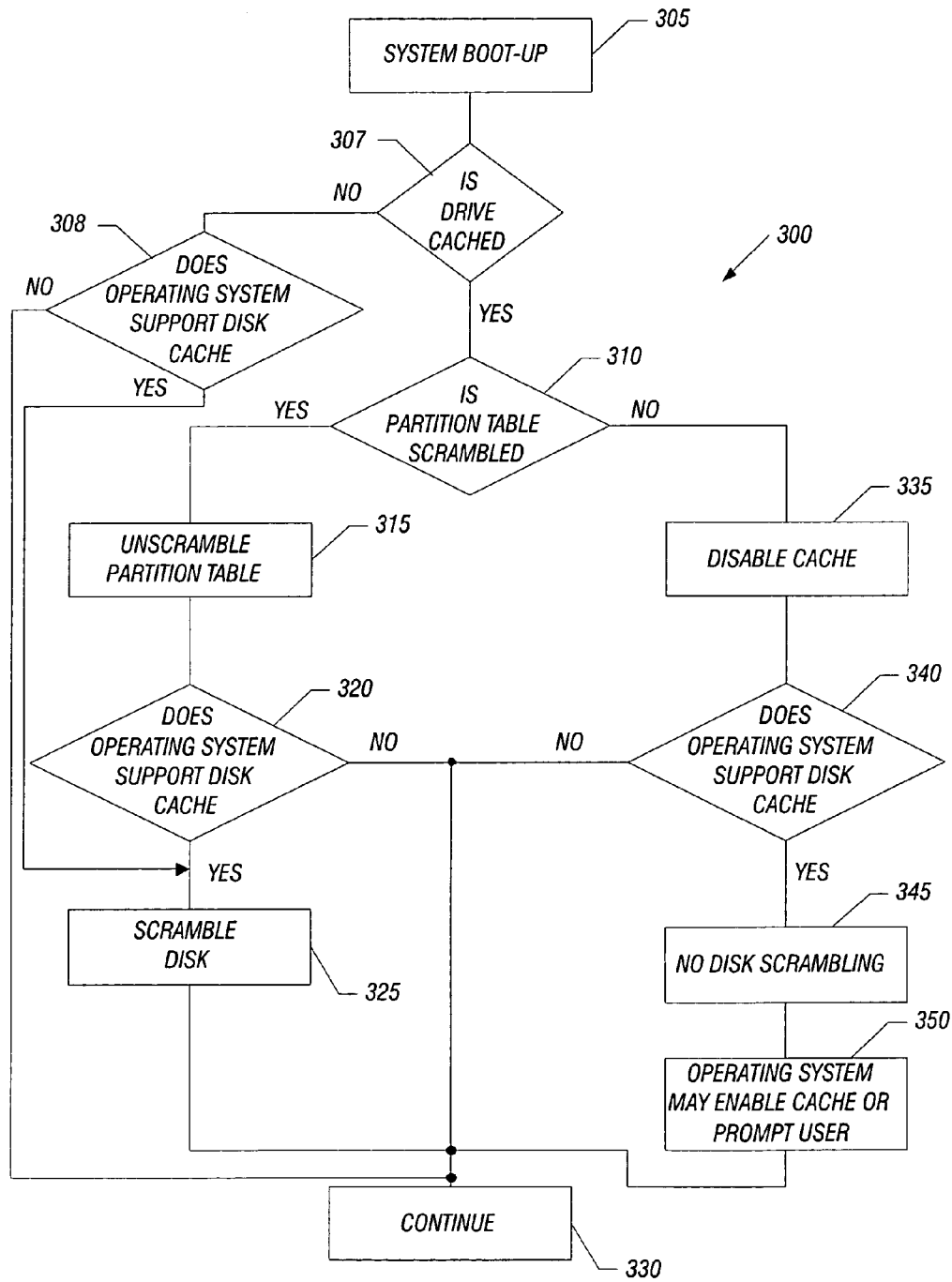
FIG. 3 is a flow chart in accordance with another embodiment of the present invention.

Referring to FIG. 3, an algorithm 300 for maintaining disk cache coherency in accordance with one embodiment of the invention may be implemented in hardware, or in software by executing instructions stored in a medium in system 100 of FIG. 1. Mediums for storing instructions for software may include system memory 150, disk cache 160 or disk drive 170, of FIG. 1. In one embodiment, algorithm 300 may be implemented by executing instructions stored in an option read only memory that may be included with cache 160 of FIG. 1. In another embodiment, algorithm 300 may be implemented by executing instructions stored as a device driver in system memory 150. Other implementations are within the scope of embodiments of the invention.

During system boot-up 305, instructions may be executed to determine if a disk drive 170 has been cached, as illustrated in diamond 307. In one embodiment, a disk cache identifier stored on the disk drive 170 may indicate that the disk drive 170 is cached. In another embodiment, a disk drive identifier stored in disk cache 160 may indicate that the disk drive 170 is cached. If the disk drive 170 has not been cached, then an operating system which supports disk cache may prompt a user to enable disk caching, as indicated in diamond 308. If the user enables caching, the disk partition table of disk drive 170 may be scrambled, as illustrated in block 325. By scrambling the disk partition table, disk drive 170 may not be accessible to a second operating system that may not support cache. Therefore, disk-cache incoherency may be avoided.

If the disk drive 170 has been cached, then the disk partition table may be read to determine if it has been scrambled, as indicated in diamond 307 and 310. This determination may be made, for example, by reading the disk partition table and comparing the table to an industry standard format. A nonstandard format may indicate that the disk partition table has been scrambled. If the disk partition table on the disk drive 170 has been scrambled then executed instructions may unscramble the partition table as illustrated in block 315. Further executed instructions may determine if the operating system or device driver that may be loading supports disk caching, as determined in diamond 320. If the operating system or device driver supports disk caching, then the cache driver or operating system may re-scramble the disk partition table, as illustrated in block 325. The operating system driver may intercept reads/writes to the scrambled partition table and provide access to equivalent unscrambled data while preserving the scrambling. Then, the operating system may continue its normal operation as indicated in block 330. By scrambling the disk partition table, disk drive 170 may not be accessible to a subsequent operating system that may not support cache. Therefore, disk-cache incoherency may be avoided.

However, if the operating system does not support disk caching, then the partition table remains unscrambled and the operating system continues as indicated in diamond 320 and block 330. Consequently, the disk drive 170 may be accessible to subsequent operating systems and disk-cache coherency may be maintained.

However, if the partition table on a cached drive is not scrambled after system boot-up 305, then caching may be disabled, as illustrated in block 335. In one embodiment, disabling the cache may include flushing and/or emptying the cache. Then, and as indicated in diamond 340, the operating system may continue in its normal operation if the operating system does not support disk caching, as determined in diamond 340. However, if the operating system does support disk caching, then the disk may not be scrambled, as indicated in block 345. In one embodiment, the operating system or cache driver may enable the cache or, in another embodiment, prompt a user to determine if caching is desired, as indicated in block 350. Then, the operating system would continue in its normal operation as indicated in block 330. If the partition table is scrambled, disk drive 170 may not be accessible to a subsequent operating system that may not support cache since block 315 will not be executed and the partition table may be left scrambled. Therefore, disk-cache incoherency may be avoided.

Algorithms 200 and 300 may be implemented in hardware or by executing code that is stored in any memory in system 100 of the FIG. 1. All or part of the code may be stored in system memory 150 which may include read only memory, random access memory and/or flash memory. Additionally, the algorithm may be implemented by code that is stored in memory which may be part of the disk cache 160 of FIG. 1.

While the present invention has been described with respect to a limited number of embodiments, those skilled in the art will appreciate numerous modifications and variations therefrom. It is intended that the appended claims cover all such modifications and variations as fall within.

What is claimed is:

1. A method comprising:
responsive to enabling a cache, scrambling a partition table of a disk drive associated with said cache.

2. The method of claim 1 further comprising recording a disk drive identifier on said cache.

3. The method of claim 1 further comprising recording a cache identifier on said disk drive.

4. The method of claim 1 further comprising restoring a scrambled partition responsive to disabling said cache.

5. The method of claim 1 further comprising flushing a dirty cache line.

6. A method comprising unscrambling a disk partition table of a disk drive coupled to a cache during a system boot-up if said disk partition table is scrambled.

7. The method of claim 6 further comprising scrambling said disk partition table if an operating system supports disk caching.

8. The method of claim 6 further comprising disabling a cache if said partition table is not scrambled at the system boot-up.

9. The method of claim 6 further comprising flushing said cache.

10. A system comprising:
a cache;
a disk drive coupled to said cache; and
at least one memory device coupled to said disk drive to store instruction, that if executed, enable said disk drive to store a scrambled partition table if said cache is enabled.

11. The system of claim 10 wherein said at least one memory device stores instructions, that if executed, enable said system to store a disk drive identifier corresponding to said disk drive.

12. The system of claim 10 wherein said at least one memory device stores instructions, that if executed, enable said system to store a cache identifier corresponding to said cache.

13. The system of claim 10 wherein said at least one memory device stores instructions, that if executed, enable said system to restore said partition table if said cache is disabled.

14. The system of claim 10 wherein said at least one memory device stores instructions, that if executed, enable said system to flush a cache line.

15. The system of claim 10 wherein said at least one memory device comprises an option read only memory.

16. The system of claim 10 wherein said cache comprises a polymer memory.

17. The system of claim 16 wherein said polymer memory comprises a ferroelectric memory.

18. The system of claim 10 wherein said cache comprises a dynamic random access memory memory.

19. The system of claim 10 wherein said polymer memory comprises a flash memory.

20. An article comprising a computer readable medium storing instructions that, if executed, enable a processor-based system to scramble a partition table responsive to enabling a cache.

21. The article of claim 20 further storing instructions that, if executed, enable a processor-based system to record a disk drive identifier on said cache.

22. The article of claim 20 further storing instructions that, if executed, enable a processor-based system to record a cache identifier on a disk drive.

23. The article of claim 20 further storing instructions that, if executed, enable a processor-based system to restore said scrambled partition responsive to disabling said cache.

24. The article of claim 20 further storing instructions that, if executed, enable a processor-based system to flush a dirty cache line.

25. An article comprising a computer readable medium storing instructions that, if executed, enable a processor-based system to unscramble a partition table if said partition table is scrambled at boot-up.

26. The article of claim 25 further storing instructions that, if executed, enable said processor-based system to scramble said partition table after boot-up responsive to a cache driver.

27. The article of claim 25 further storing instructions that, if executed, enable said processor-based system to disable a cache if said partition table is not scrambled at boot-up.

28. The article of claim 25 further storing instructions that, if executed, enable a processor-based system to flush said cache.

* * * * *